US012660730B2

(12) United States Patent
Hoellinger et al.

(10) Patent No.: US 12,660,730 B2
(45) Date of Patent: Jun. 23, 2026

(54) METHOD AND INSTALLATION FOR WORKING A PLOT OF LAND WITH AT LEAST ONE REPLENISHED AGRICULTURAL ROBOT

(71) Applicant: KUHN SAS, Saverne (FR)

(72) Inventors: Marie Hoellinger, Rimling (FR); Philippe Potier, Zittersheim (FR)

(73) Assignee: KUHN SAS, Saverne (FR)

( * ) Notice: Subject to any disclaimer, the term of this patent is extended or adjusted under 35 U.S.C. 154(b) by 43 days.

(21) Appl. No.: 18/729,989

(22) PCT Filed: Jan. 24, 2023

(86) PCT No.: PCT/EP2023/051626
§ 371 (c)(1),
(2) Date: Jul. 18, 2024

(87) PCT Pub. No.: WO2023/144119
PCT Pub. Date: Aug. 3, 2023

(65) Prior Publication Data
US 2025/0113757 A1 Apr. 10, 2025

(30) Foreign Application Priority Data
Jan. 25, 2022 (FR) ...................................... 2200634

(51) Int. Cl.
*A01B 69/04* (2006.01)
(52) U.S. Cl.
CPC .................................. *A01B 69/008* (2013.01)
(58) Field of Classification Search
CPC ............... A01B 69/008; G05D 1/0219; G05D 1/0291
(Continued)

(56) References Cited

U.S. PATENT DOCUMENTS

2011/0153136 A1* 6/2011 Anderson ............ G05D 1/0246
348/E7.086
2013/0325242 A1* 12/2013 Cavender-Bares .. A01B 69/008
701/25
(Continued)

FOREIGN PATENT DOCUMENTS

EP 3 766 323 A1 1/2021
JP 6673786 B2 * 3/2020
(Continued)

OTHER PUBLICATIONS

I. A. Hameed, "A Coverage Planner for Multi-Robot Systems in Agriculture," 2018 IEEE International Conference on Real-time Computing and Robotics (RCAR), Kandima, Maldives, 2018, pp. 698-704, doi: 10.1109/RCAR.2018.8621801. (Year: 2018).*
(Continued)

*Primary Examiner* — Abby J Flynn
*Assistant Examiner* — Merritt Levy
(74) *Attorney, Agent, or Firm* — Oblon, McClelland, Maier & Neustadt, L.L.P.

(57) ABSTRACT

A method of working a plot of land by at least one autonomously and independently operating agricultural robot including, during or after an assessment and planning stage, at least one preferred headland portion specifically intended for input supply and in which at least one supply station for at least one input is located, with the ability to move or reposition within this portion, the at least one robot heading towards this portion when a supply instruction is received or generated by it.

9 Claims, 5 Drawing Sheets

(58) Field of Classification Search
USPC .......................................................... 701/50
See application file for complete search history.

(56) References Cited

U.S. PATENT DOCUMENTS

| | | | |
|---|---|---|---|
| 2015/0051779 A1* | 2/2015 | Camacho-Cook ... | A01B 69/008 |
| | | | 701/23 |
| 2018/0206390 A1* | 7/2018 | Sakaguchi .......... | G05D 1/0278 |
| 2020/0409371 A1* | 12/2020 | Ueda ................. | G01C 21/3415 |

FOREIGN PATENT DOCUMENTS

| | | | | |
|---|---|---|---|---|
| JP | 2020-110108 A | 7/2020 | | |
| JP | 2020-129393 A | 8/2020 | | |
| JP | 2021-184259 A | 12/2021 | | |
| WO | WO-2018105400 A1 * | 6/2018 | ............ | A01B 69/00 |
| WO | WO 2020/100810 A1 | 5/2020 | | |
| WO | WO 2021/145009 A1 | 7/2021 | | |

OTHER PUBLICATIONS

T. Makino, H. Yokoi and Y. Kakazu, "Development of a motion planning system for an agricultural mobile robot," SICE '99. Proceedings of the 38th SICE Annual Conference. International Session Papers (IEEE Cat. No.99TH8456), Morioka, Japan, 1999, pp. 959-962, doi: 10.1109/SICE.1999.788679. (Year: 1999).*

H. Wang and N. Noguchi, "Autonomous maneuvers of a robotic tractor for farming," 2016 IEEE/SICE International Symposium on System Integration (SII), Sapporo, Japan, 2016, pp. 592-597, doi: 10.1109/SII.2016.7844063. (Year: 2016).*

C. Zhang and N. Noguchi, "Development of leader-follower system for field work," 2015 IEEE/SICE International Symposium on System Integration (SII), Nagoya, Japan, 2015, pp. 364-368, doi: 10.1109/SII.2015.7404947. (Year: 2015).*

International Search Report & Written Opinion issued Mar. 24, 2023 in PCT/EP2023/051626 filed on Jan. 24, 2023, 10 pages (with English Translation).

* cited by examiner

Fig. 1A
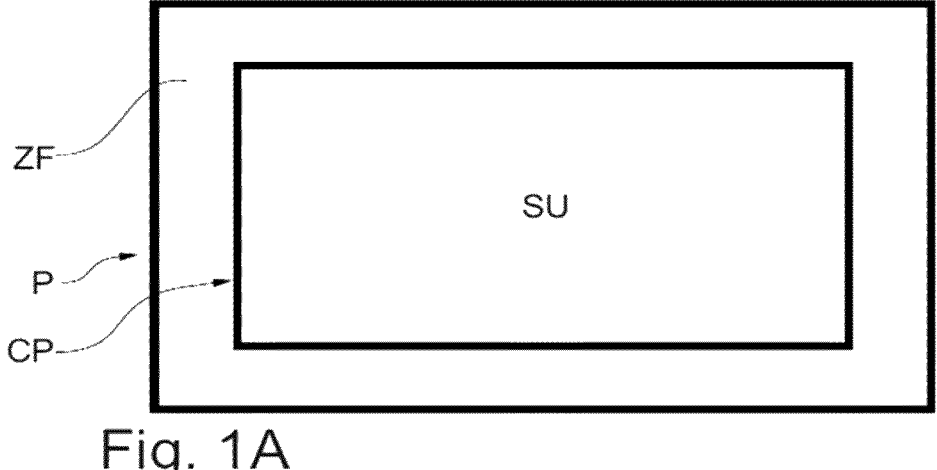
Fig. 1A
Fig. 1B
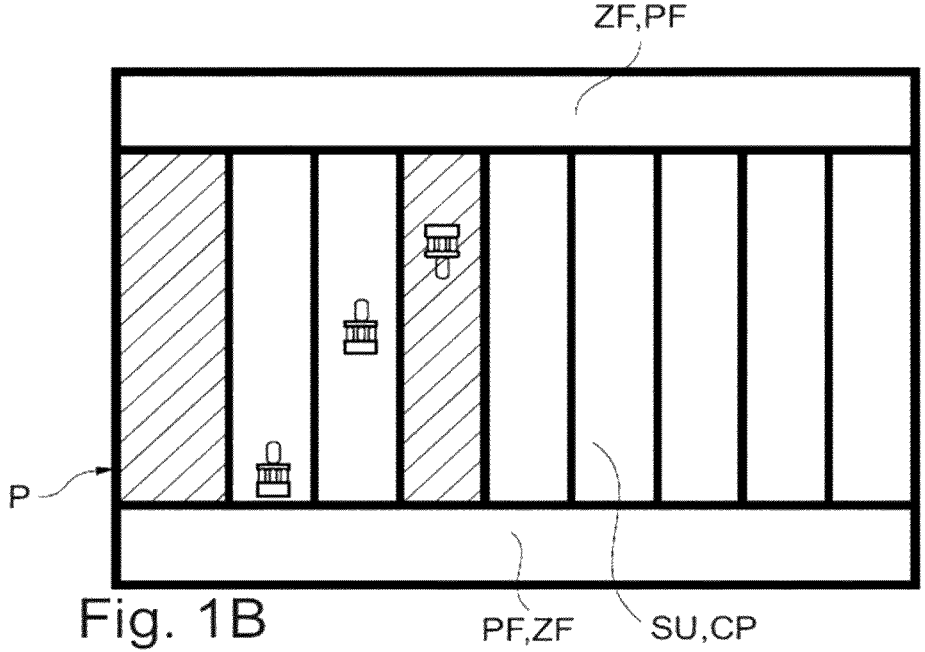
Fig. 1B

Fig. 1C
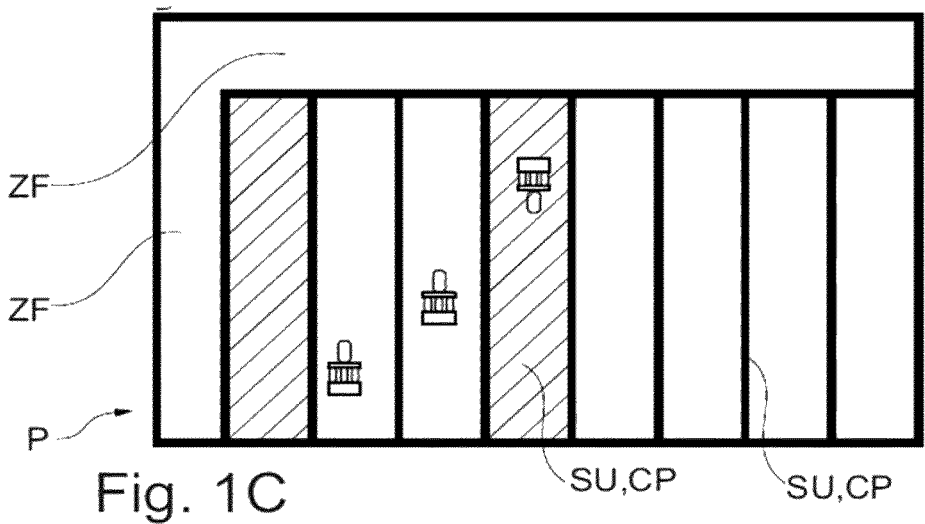
Fig. 1C
Fig. 2
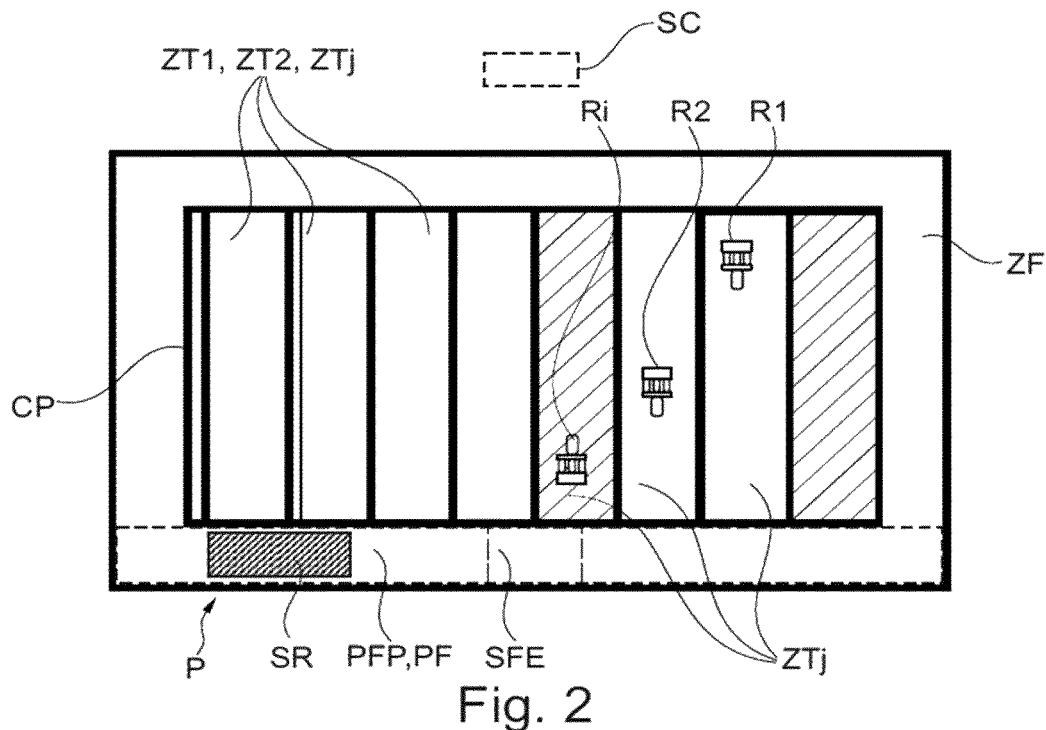
Fig. 2

Fig. 3
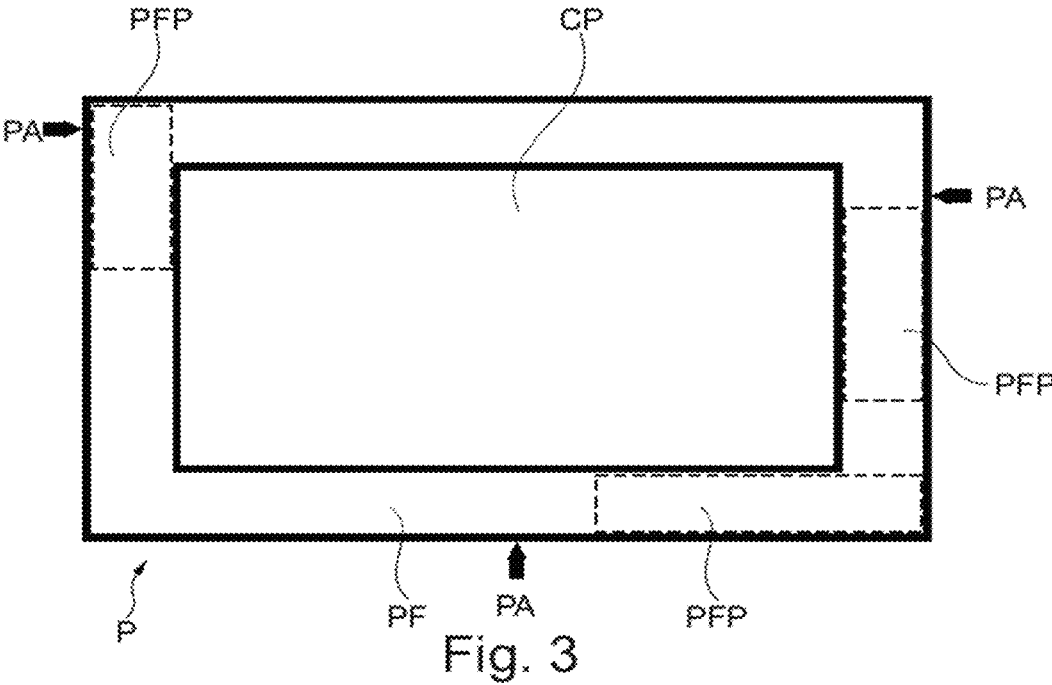
Fig. 3
Fig. 4A
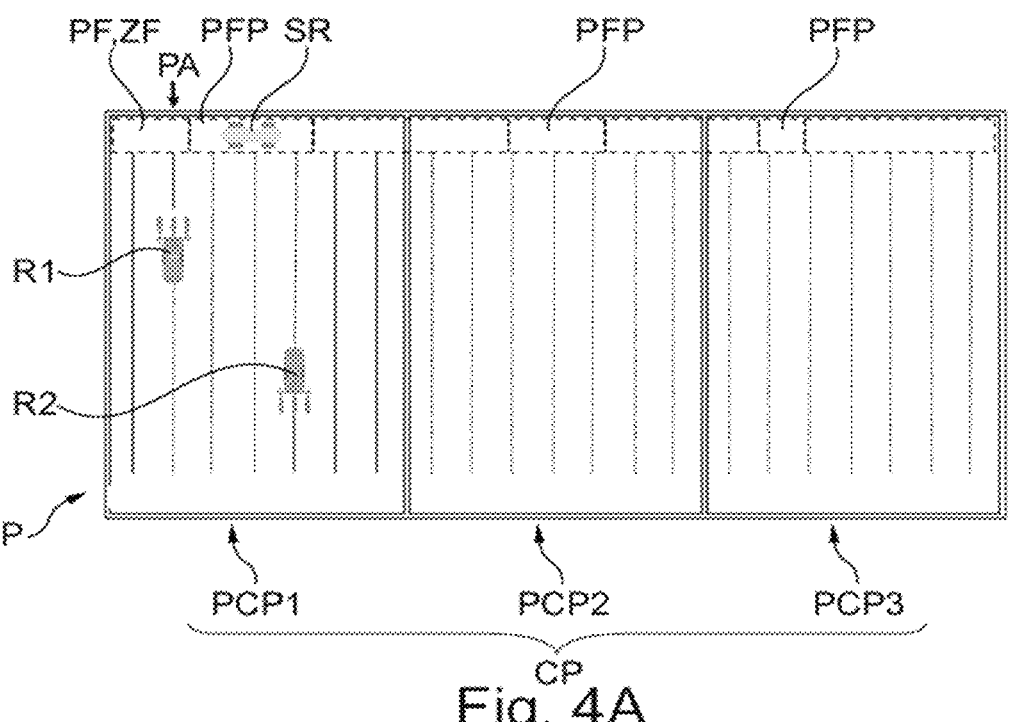
Fig. 4A

Fig. 4B
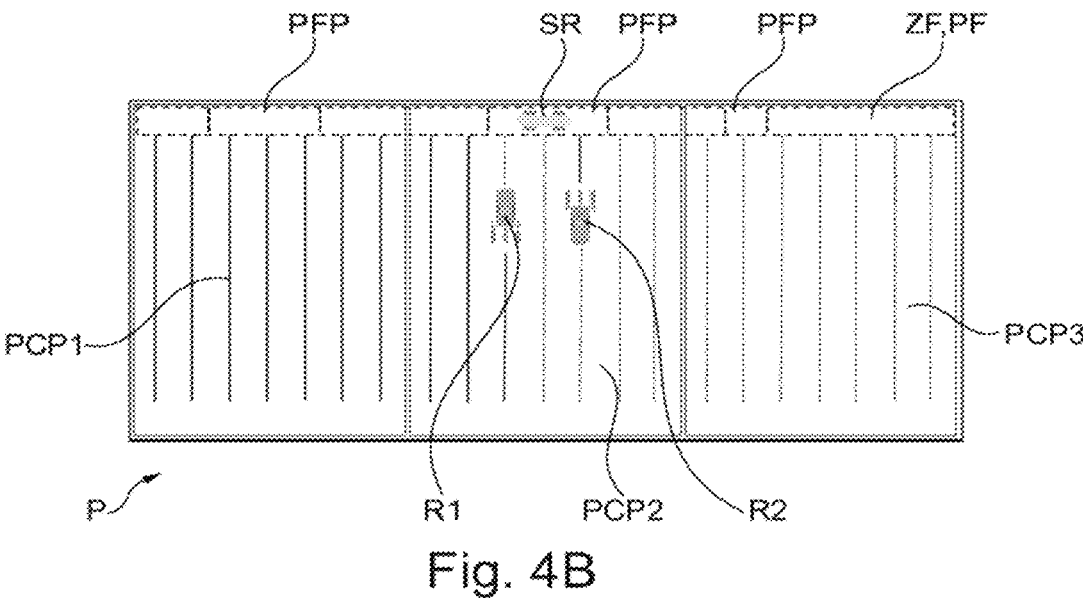
Fig. 4B
Fig. 5A
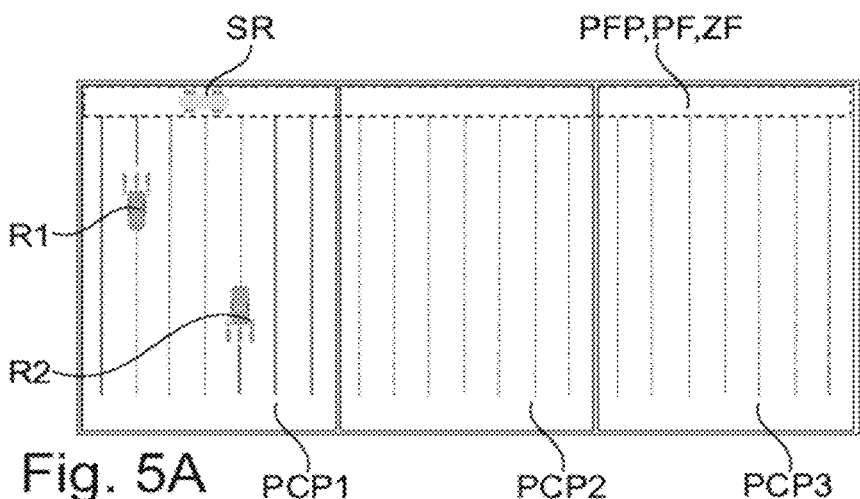
Fig. 5A

Fig. 5B
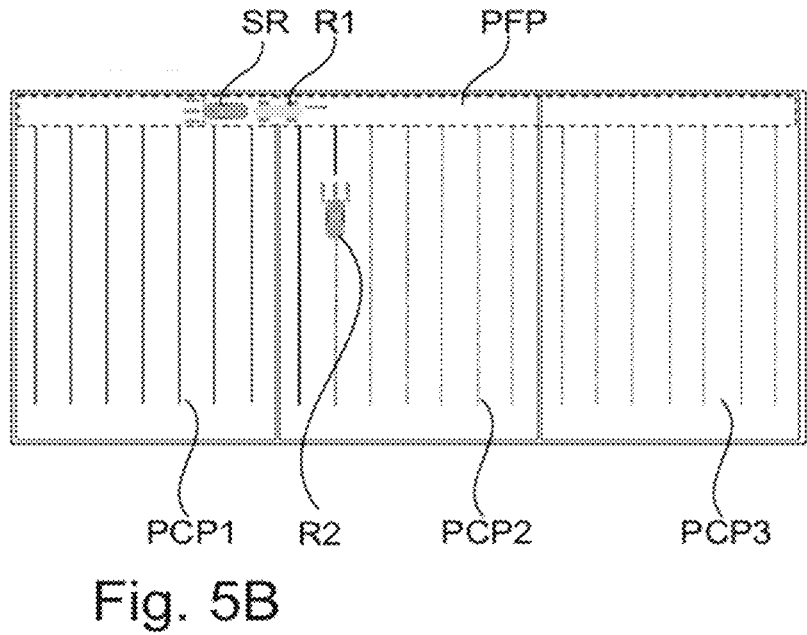
Fig. 5B
Fig. 5C
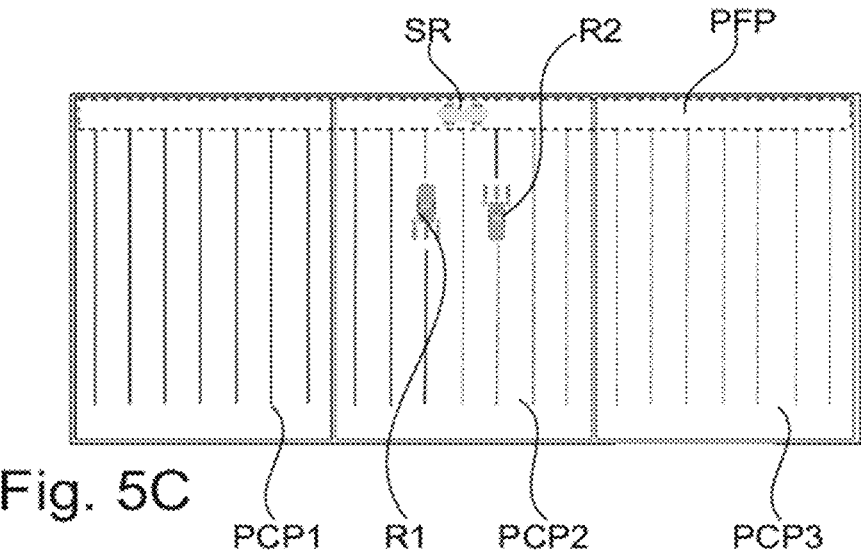
Fig. 5C

METHOD AND INSTALLATION FOR WORKING A PLOT OF LAND WITH AT LEAST ONE REPLENISHED AGRICULTURAL ROBOT

The present invention relates to the field of agricultural machinery and more particularly to the working of the soil and/or plants of a plot of land by at least one highly-automated autonomous agricultural machine, generally referred to as a robotic agricultural vehicle or agricultural robot, preferably by a fleet of at least two such vehicles or machines. In this context, the subject of the invention is a method for working a plot of land by at least one agricultural robot and with improved input supply, as well as an agricultural equipment implementing this method.

Typically, a plot of land P is divided into a main field CP (corresponding to the useful surface SU which can be optimally used) and a headland zone ZF which borders this main field on all or part of its peripheral circumference (see FIG. 1A-headland around the entire periphery of the field CP). This headland zone ZF can be continuous and surrounding in relation to SU or CP, as in FIG. 1A, it then extends to all sides of the main field. It may also extend along only some sides of the main field, being fragmented (as in FIG. 1B) or continuous (see FIG. 1C). Traditionally, this headland is present on at least one, advantageously several, side(s) of the main field and preferably at least at each end of the rows or working paths of the plot of land. It is primarily used by the agricultural vehicles or robots to make U-turns and, more generally, to maneuver from one row to another in the main field. However, such a headland zone ZF can also extend into the main field CP, in particular around a zone that cannot be worked upon, such as for example an obstacle (rock, pylon, etc.).

Of course, the plot of land can be worked by a single vehicle or robot, but usually a fleet of at least two robots is used, which may or may not be of the same type. One known solution is then to divide the plot of land to be worked upon, or more precisely the main field, into work zones of fixed width corresponding to the working width of the agricultural robots used (each zone is worked in one pass, for example) or to a multiple (preferably a whole number) of this width (each zone is then worked in an even or odd number of passes), and to assign these zones to the different robots, said zones being assigned/reassigned in real time according to the progress of the work by the different robots and the evolution of the situation over the working duration upon the plot of land. The aforementioned work zones, which constitute fractional portions of the main field, can be assigned (for a given work phase or assignment of a plot of land) either exclusively to a single robot of a fleet to be worked upon by the latter, or alternatively to several robots which work it simultaneously or successively, performing identical or similar, different or even complementary tasks.

When working upon a plot of land, the vehicles or robots, and the tools associated with them, consume varied inputs, depending on their type and the nature and features of the agricultural operation(s) they carry out in the plot of land, namely: fuel/electrical energy; seeds; fertilizer, plant protection products, etc. Normally, a single station is sufficient for a given plot of land. However, in the case of very large plots of land, of a very large number of robots and/or a high number of different inputs, it may also be possible to implement at least two different supply stations.

As their work progresses, these inputs need to be supplied to the vehicles or robots. These supplies are carried out via at least one reload station, either manually or autonomously.

Such a station is advantageously mobile and can be moved by an operator, manually, or also autonomously by one of the vehicles (even without any assistance if it is motorized and guided).

The greater the number of vehicles or robots working upon the plot of land, and the larger the plot of land, the greater the need for frequent reloading. This can result in the need to (often) move the station from one side of the plot of land to the other if reloading locations are not optimized. This situation is not satisfactory in terms of fuel consumption or in terms of lost time, since either the station has to be moved, or the robots made to travel (which do not work during these travels). Therefore, when the station remains at a fixed location, the robots will have to travel towards it to reload, sometimes over long distances (non-working round trips).

Document EP 2 855 102 discloses a process for reloading a vehicle at a station, the supply taking place autonomously when a low input threshold is exceeded. The positioning of the station in the plot of land is optimized according to the assignment, and the station is set up manually, and remains in place. A supervisor can assist the user in choosing the station position. This solution therefore offers no flexibility or possible adaptability, and is based on a single initial choice of fixed location for the station.

Document WO 2014/137813 discloses a supply method for agricultural machines, in which precise potential supply points are predefined on at least two opposite sides of the plot of land, preferably in the two opposite headlands in which the U-turns take place.

This solution aims to optimize travels between the vehicles and the supply station, by implementing a cost estimation/optimization function, and real-time assessment of the energy consumption and reserves of the vehicles.

However, this known solution is complex to implement, does not make it possible to optimize the travel of the station, which can be moved on several sides of the field, and does not either seek a satisfactory compromise between possible station travel and vehicle travel.

The purpose of the present invention is to compensate at least for the main limitations of the previous solutions.

To this end, the subject of the invention is a method of working a plot of land by at least one autonomous and independent agricultural machine or robot, said plot of land comprising at least one access point or entry and at least one headland zone, which may or may not surround a main field, formed by one or more headland portions, each associated with one side of the main field, or with an unworked zone of the latter, said method consisting, prior to and/or progressively during the progress of the work upon said main field and possibly the headland zone, in sub-dividing said main field into elementary work zones, preferably in the form of strips, at least one end of which is bordered by a headland portion and each of the work zones is allocated to a robot to be worked upon by the latter in one or more pass(es), advantageously along a longitudinal dimension, said method also consisting, after prior assessment and planning of the work to be carried out on the plot of land in question, in programming each robot with instructions and/or control sequences prior to starting the work, and at least one input supply sequence for at least one of the robots, whether planned or not, which may occur while working upon the entire plot of land in question, method characterized in that it consists in defining, during or after the assessment and planning stage, at least one preferred headland portion specifically intended for input supply(-ies) and in which at least one supply station for at least one input is located, with the ability to move or reposition within this portion, each robot heading towards this portion when a supply instruction is received or generated by it.

The invention will be better understood through the following description, which refers to preferred embodiments given as non-limiting examples and explained with reference to the attached schematic drawings, in which:

FIG. 1A,

FIG. 1B and

FIG. 1C illustrate a plot of land with different configurations of headland zones (surrounding, fragmented or continuous).

FIG. 2 illustrates a first example of how to define a preferred headland portion and to work a plot of land according to the invention;

FIG. 3 shows, on the same figure, several alternative options of locating a preferred headland portion according to the invention, each based on a different access point or entry;

FIG. 4A and

FIG. 4B illustrate two successive phases of work upon a plot of land comprising three main field portions and three separate preferred headland portions, with travel of the supply station as work progresses, and,

FIG. 5A,

FIG. 5B and

FIG. 5C illustrate three successive phases of work upon a plot of land comprising three main field portions and a common preferred headland portion, with travel of the supply station as work progresses.

FIGS. 2 to 5 illustrate a method of working a plot of land (P) by at least one autonomously and independently operating agricultural machine or robot (R1, R2, . . . , Ri), in relation to various possible implementation variants. This plot of land (P) comprises at least one access point or entry (PA) and at least one headland zone (ZF), which may or may not surround a main field (CP), formed by one or more headland portions (PF), each associated with one side of the main field (CP), or with an unworked zone thereof.

The aimed method consists, prior to and/or progressively as work progresses upon said main field (CP) and possibly the headland zone (ZF), in sub-dividing said main field (CP) into elementary work zones (ZT1, ZT2, . . . , ZTj), preferably in the form of strips, at least one end of which is bordered by a headland portion (PF) and each of the work zones is allocated to a robot (R1, R2, . . . . Ri) to be worked upon by the latter in one or more pass(es), advantageously along a longitudinal dimension. This method also consists, after prior assessment and planning of the work to be carried out on the plot of land (P) in question, in programming each robot (R1, R2, . . . , Ri) with instructions and/or control sequences before starting the work. In addition, at least one input supply sequence for at least one of the robots (R1, R2, . . . , Ri), whether planned or not, may occur when working upon the entire plot of land (P) in question.

For the implementation of this method, all information relating to the plot of land (P) such as: size; shape; surface area of each work zone and of each main field portion constituting it; foreseeable working paths of the robots; shape, position and extension of the headland(s); etc., are known to the system running the work planning and management software for the plot of land (P), for example a central common management and control system (SC) able and designed to assess and plan the work to be carried out on a plot of land (P) in question and to communicate with the robot(s) (R1, Ri, . . . ) in order to give them instructions and/or controls. Likewise, fuel consumption, the amount of fuel/electricity in the tank/battery, input consumption (based on the seed/fertilizer ratio), preset ratios [input mass/area to be worked upon] and the foreseeable distance to be covered are known for each robot and/or tool. These robots are of course also equipped with sensors making it possible to measure some of these parameters continuously, such as travel speed, remaining input level in real time, instant energy consumption, etc.

In accordance with the invention, this method further consists in defining, during or after the assessment and planning stage, at least one preferred headland portion (PFP) specifically intended for input supply(-ies) and in which at least one supply station (SR) for at least one input is located, with the ability to move or reposition within this portion (PFP), each robot (R1, R2, . . . , Ri) heading towards this portion (PFP) when a supply instruction is received or generated by it.

The method can be implemented with a single agricultural robot. However, in a preferred application context, it is operated in conjunction with at least two (see FIGS. 4 and 5), and even preferably a fleet of at least three (see FIGS. 1B, 1C and 2) robots (R1, R2, . . . , Ri).

The method according to the invention does not seek to define a precise supply point, but rather a common zone in which all robot supplies will be carried out centrally. There can be multiple supply points, but all are located within a defined zone, preferably on the same side of the plot of land, to reduce both the number of movements of the reload station and vehicle travel to the station. The precise supply point(s) is/are defined by a central management and control system (supervisor SC) when the supply is required during the autonomous operation of a given robot.

The invention makes it possible to minimize station travel while simultaneously reducing robot travel towards the station. A maximum reduction in robot travel is not sought, as this would lead to greater station travel, which is not desired.

In conjunction with the central management and control system (SC), the user can select a portion of the headland when generating the assignment for the agricultural robots, and define it as a preferred supply zone, known as a preferred headland portion (PFP).

It is understood by those skilled in the art that the invention uses a supply schedule for agricultural robots which avoids unladen travel. For example, if the input (seed, fertilizer, etc.) is the limiting factor, a robot will not start working a new round trip in the main field (CP) if there is not enough input left in its hopper. As the system and/or each robot knows the amount of input required to work a round trip via the assignment, and as the amount of input available in the hopper is known, it can determine whether the next round trip can be worked completely, or whether it is necessary to obtain supplies in advance when the vehicle is in or near the preferred headland portion (PFP).

Thanks to the invention, two improvements can be achieved in the supply of agricultural robots, namely: i) a reduction in the distances between the robots and the supply station, and ii) a minimization of the distances involved in moving said station.

In connection with the invention, each preferred headland portion (PFP) is defined as corresponding to a headland portion (PF), advantageously in the form of a strip of substantially constant width, bordering one side of the main field (CP), or a partial fraction of such a portion (PF), the portion (PFP) being intended for working upon or not.

As mentioned in the introduction, the headland(s) does not necessarily cover the entire main field (CP): instead of extending to all sides of the main field, only some, or even one, of the sides may have one, and the preferred headland portion (PFP) may be located in any part of the headland, in other words on any side. However, the preferred headland portion (PFP) always lies within the outer outline of the plot of land (P), and cannot extend beyond it, even partially. This is because the robots' autonomous operation imposes a safety outline which they cannot leave (it is possible, however, to redefine the plot outlines, if necessary, to include the preferred headland).

The supply station(s) (SR) can be moved autonomously, by a robot or by an operator (alerted by a central common management and control system or a robot, and with a tractor or similar vehicle capable of towing or pushing the station(s)).

Advantageously, each preferred headland portion (PFP) is determined based on the access point or entry (PA) to the plot of land (P) in question, which it is advantageously located close to or incorporates (see FIG. 3).

According to one feature of the invention, the method can consist in arranging and dimensioning each preferred headland portion (PFP) in such a way that during a supply operation, the supply station (SR) and the supplied robot (R1, R2, ..., Ri), and if applicable its tool, are both located entirely within the preferred headland portion (PFP) in question. This no-overflow condition imposes minimum dimensions for the preferred headland portion (PFP) so that all supply-related maneuvers can take place within its perimeter.

Of course, the preferred headland portion (PFP) does not necessarily extend over the full length of one side of the main field (CP). The user can choose to retain only a portion of a headland associated with one side, for reasons of logistics and practicality for the farmer who has to bring the supply or reload station (SR) to the plot of land (for example: plot surroundings obstructed by a forest, a waterway, a recess, dependence of the position of the access point into the field, etc.).

The choice of positioning the preferred headland portion (PFP) is the responsibility of the user, although the central common management and control system (SC) may suggest one or more positions, optimal or not, determined by the data available to it and relating to the parameters and features mentioned above.

According to one possible embodiment of the invention, it may be possible to predefine in each preferred headland portion (PFP), in addition to a first initial location for the supply station (SR), at least one second location forming a supply point, advantageously on the basis of prior estimates of input consumption. This (or these) subsequent position(s) of the station may possibly be added or modified during the course of work upon the plot of land (P), depending on unforeseen changes in the progress of the work, exceptional circumstances or random incidents.

As shown in FIGS. 4 and 5 by way of example, it may be possible to move the supply station (SR) in the preferred headland portion (PFP) concerned, either autonomously or by towing or pushing, if necessary via one of the robots (R1, R2, ..., Ri), depending on the progress of the work in the plot of land (P).

In accordance with one advantageous embodiment of the invention, particularly in the case of a large plot of land, the method may consist, during or after the assessment and planning stage, in sub-dividing the main field (CP) into at least two main field portions (PCPi), each comprising several elementary work zones (ZT1, ZT2, ..., ZTj), preferably in the form of strips, assigning either to each of these portions (PCPi) a separate own preferred headland portion (PFPi) (see FIG. 4), or a preferred headland portion (PFP) common to all these portions (PCPi) (see FIG. 5), and moving the supply station (SR) within the common preferred headland portion (PFP), or from one preferred headland portion (PFPi) to the next, depending on the progress of work in the plot of land (P) in question, such movement advantageously taking place when each robot (R1, R2, ..., Ri) has sufficient inputs to complete its work in the main field portion (PCPi) being worked upon.

For example, the supply station (SR) can be moved as described in French patent application no. 2101107 dated Feb. 5, 2021 in the name of the applicant, the contents of which are incorporated herein by reference.

In relation to FIGS. 4 and 5, one can note, for example, that:

in FIG. 4A, (PCP1) is being worked upon by the robots (R1 and R2) and (PCP2) and (PCP3) remain to be worked upon, whereas in FIG. 4B, (PCP1) has been worked upon, (PCP2) is being worked upon and (PCP3) remains to be worked upon, the supply station (SR) having been moved from the preferred headland portion (PFP) associated with (PCP1) to the preferred headland portion (PFP) associated with (PCP2);

in FIG. 5A, (PCP1) is being worked upon by the two robots (R1 and R2) and (PCP2) and (PCP3) remain to be worked upon; in FIG. 5B, (PCP1) has been worked upon, (PCP2) is being worked upon by the second robot (R2) and (PCP3) remains to be worked upon, with the supply station (SR) being moved by the first robot (R1) from the preferred headland portion (PFP) associated with (PCP1) to the preferred headland portion (PFP) associated with (PCP2); and in FIG. 5C, (PCP1) has been worked upon, (PCP2) is being worked upon by the two robots (R1 and R2), and (PCP3) remains to be worked upon, with the supply station (SR) being positioned in the preferred headland portion (PFP) associated with (PCP2).

One can note that the travel of one of the robots (Ri) to bring it closer to the supply station (SR) in order to move this station can be used to supply this robot, or vice versa.

In accordance with a further feature of the invention, the positioning of the supply station (SR) in the preferred headland portion (PFP) concerned is modified when the location it occupies temporarily becomes part of a headland segment (SFE) located at the end of an elementary work zone (ZT1, ZT2, ..., ZTj) worked upon by a robot (R1, R2, ..., Ri), this segment if applicable being allocated exclusively to said robot for the duration of its work in this zone.

Such a principle of exclusive allocation of elementary work zones may in particular be of the type described in French patent application no. 2009705 dated Sep. 24, 2020 in the name of the applicant, the contents of which are incorporated herein by reference.

In addition to any possible planned and programmed supply or supplies, or as an alternative to any pre-determination, a given robot (R1, R2, ..., Ri) advantageously performs a supply operation when the level of at least one input is insufficient to enable it, while working normally, to make a round trip in an elementary work zone (ZT1, ZT2, ..., ZTj) it must work upon or upon which it is currently working.

By way of non-limiting examples, one can note that the features of the method according to the invention, in particular those relating to the implementation of a preferred headland, can be implemented in or in connection with known agricultural planning and control software, in particular of the type known under the name "Fieldplanner" from Lacos Computerservice, or implemented in the "AgBot" robotic solution from AGXeed.

By way of possible practical procedures for the method according to the invention, two non-limiting examples are described below in relation to the FIGS. 4 and 5.

In accordance with a first possible scenario, described in relation to FIGS. 5, the plot of land (P) is divided into 3 work zones (PCP1, PCP2 and PCP3) and 2 robots (R1 and R2) are assigned to the agricultural work in this plot of land. The plot of land includes a headland (ZF) along its upper edge or side in aerial view. The user (or the software) has defined the preferred headland portion (PFP) within the entire headland (PF). The robots and the supply station (SR) are brought to the plot of land to be worked upon and positioned at their starting point (in the 1st zone to be worked upon for the 2 robots and in the preferred headland portion for the station). The two robots each start work upon the 1st zone of the plot of land (PCP1) according to the assignment transmitted to them by the central common management and control system (SC) (FIG. 5A).

The robot (R2) changes zone and moves to the zone (PCP2) when it has finished the work assigned to it in the zone (PCP1). The robot (R1) in turn finishes its assigned work in the zone (PCP1) and also moves to the zone (PCP2). In the process, it takes the opportunity to move the station (SR) and position it opposite the zone (PCP2) in the section of the preferred headland portion (PFP) associated with this second zone, while remaining in the preferred headland during travel (FIG. 5B). Depending on the level of the various inputs present in the robot (R1), the latter may use the opportunity if necessary to carry out or not its supply at the station (SR) before resuming work in the zone PCP2 (supply may take place just before or just after moving it).

When the robot (R1) was moving the station, the other robot (R2) continued its work in the second zone (PCP2). Once the robot (R1) has moved the station, and when the level of one (or more) of its inputs reaches a critical level (in other words R2 can no longer make a complete round trip), then the robot (R2) travels to the reload station (SR) when it approaches the preferred headland portion (PFP). It refuels and continues its work in zone (PCP2) (FIG. 5C).

Although not shown, it is understood by those skilled in the art that the transition from the second zone (PCP2) to the third zone (PCP3) is similar to that from the first zone (PCP1) to the second zone (PCP2).

In this case, for the implementation of the method according to the invention, the user (or the software) has chosen that the last robot to leave the zone worked upon will be responsible for moving the station (SR) within the preferred headland portion (PFP). In this case, this strategy is defined when the assignment is defined in the software. Of course, any robot can go to the supply station at any time during its assignment, if it needs to reload at least one input.

A second scenario for implementing the method is illustrated in part by FIGS. 4A and 4B. It is very similar to the first scenario described above, with the difference that instead of having a single preferred headland portion, three separate preferred headland portions (PFP) have been defined (by the user or the software), each associated with one of the three work zones (PCP1, PCP2 and PCP3) and covering only a fraction of the headland. The supply station (SR) will then be moved from one preferred headland portion (PFP) to another, according to the robots' travel from zone (PCP1) to zone (PCP2), then to zone (PCP3).

As shown in particular in FIGS. 2 to 5, the invention also relates to an agricultural machine combination for implementing the automated method for working upon plots of land (P), as described above.

Such a combination typically comprises a fleet of at least two mobile robots (R1, R2, . . . , Ri), equipped with suitable work tools, operating autonomously and independently, and a central common management and control system (SC) able and intended to assess and plan the work to be carried out on a plot of land (P) under consideration and to communicate with said robots in order to send instructions and/or controls to them, and possibly to receive in return operating and/or status information from said robots (R1, R2, . . . , Ri), each robot (R1, R2, . . . , Ri) also being provided with a satellite positioning or tracking device and with measuring means for its input reserves and its autonomy based on its current and estimated future consumption.

In accordance with the invention, this combination is characterized in that it also comprises at least one input supply station (SR), which is mobile, and which is initially positioned on the plot of land (P) in a preferred headland portion (PFP) predefined by the central common management and control system (SC) and in which it remains located.

In practice, the farmer brings the robots (R1, R2, . . . , Ri) and the supply/reload station to the plot of land (P). He positions the robots at the starting point of their assignment, and the supply/reload station at a first supply location, in a preferred headland portion (PFP), located within the outline of the plot of land. The rest of the operations and movements related to the assignment (working the plot of land, robot(s) travel to the station, travel of the station) are carried out fully autonomously and automatically once the assignment has been launched, via the work supervision software implemented by the central common management and control system (SC) and the robots (R1, R2, . . . , Ri). Supply/reloading as such can be carried out either also autonomously or with the intervention of an operator.

As a precautionary measure, a supply station can be provided on the plot of land, even though in theory, in other words based on a prior estimated calculation, no supply is required. This can be explained by the fact that there may be a significant difference between predicted and actual input consumption. For example, depending on soil type and humidity, a robot may consume much more fuel than initially predicted before working upon the plot of land. The actual consumption of the various inputs (and therefore the respective tank/hopper levels) is constantly monitored during the work. When the need for supply is detected (in particular in relation to the aforementioned criteria for avoiding unladen round trips), the robot concerned receives a supply instruction.

Of course, the invention is not limited to the embodiments described and shown in the attached drawings. Modifications remain possible, in particular as regards the composition of the various elements or by substitution with technical equivalents without departing from the scope of protection of the invention.

The invention claimed is:

1. A method of working a plot of land by an autonomous and independent agricultural machine or robot, said plot of land comprising an access point or entry and a headland zone, which may or may not surround a main field, formed by one or more headland parts, each of the headland parts associated with one side of the main field, or with an unworked zone of the main field, said method comprising:

prior to progress of the work upon the main field and possibly the headland zone, sub-dividing the main field into elementary work zones, in the form of strips, at least one end of the elementary work zones is bordered by a headland portion and the work zones each of is allocated to the robot to be worked upon by the robot, a size, shape, and surface area of each work zone being based on user selected parameters;

after prior assessment and planning of the work to be carried out on the plot of land in question, programming the robot with instructions and/or control sequences prior to starting the work, and an input supply sequence for the robot, which may occur while working upon the entire plot of land in question;

defining, after the assessment and planning stage, a preferred headland portion specifically intended for input supply and in which a supply station for an input is located, the supply station being configured to move or reposition within the preferred headland portion, the robot heading towards preferred headland portion when a supply instruction is received or generated by the robot; and arranging and dimensioning the preferred headland portion in such a way that during a supply operation, the supply station and the robot are both located entirely within the preferred headland portion;

automatically executing the work in the work zone by the robot; and moving the supply station in the preferred headland portion depending on the progress of the work in the plot of land so as to minimize a total of travel of the supply station and travel of the robot towards the supply station, wherein the preferred headland portion is determined based on the access point or entry to the plot of land; and wherein the one or the work zones is work on by two robots, and the supply station is moved by the last robot leaving the one of the work zones.

2. The work method according to claim 1, further comprising defining the preferred headland portion as corresponding to a headland portion, in a form of a strip of substantially constant width, bordering one side of the main field, or a partial fraction of such a portion.

3. The work method according to claim 2, further comprising predefining in the preferred headland portion, in addition to a first initial location for the supply station, at least one second location forming a supply point, based on prior estimates of input consumption.

4. The work method according to claim 2, further comprising, after the assessment and planning stage, sub-dividing the main field into at least two main field portions, each main field portion comprising several elementary work zones, in the form of strips, assigning the preferred headland portion for each of the main field portions to be either a separate own preferred headland portion, or a preferred headland portion common to all the main field portions, and in moving the supply station within the common preferred headland portion, or from one separate own preferred headland portion to the next, separate own preferred headland portion, depending on the progress of work in the plot of land in question.

5. The work method according to claim 1, further comprising predefining in the preferred headland portion, in addition to a first initial location for the supply station, at least one second location forming a supply point, based on prior estimates of input consumption.

6. The work method according to claim 1, further comprising, after the assessment and planning stage, in subdividing the main field into at least two main field portions, each main field portion comprising several elementary work zones, in the form of strips, assigning the preferred headland portion for each of the main field portions to be either a separate own preferred headland portion, or a preferred headland portion common to all the main field portions, and moving the supply station within the common preferred headland portion, or from one separate own preferred headland portion to the next, separate own preferred headland portion, depending on the progress of work in the plot of land in question.

7. The work method according to claim 1, wherein the positioning of the supply station in the preferred headland portion concerned is modified when the location the supply station occupies temporarily becomes part of a headland segment located at an end of an elementary work zone worked upon by the robot, the headland segment being allocated exclusively to said robot for the duration of its work in the elementary work zone worked upon by the robot.

8. The work method according to claim 1, wherein the robot performs a supply operation when a level of the input is insufficient to enable the robot, while working normally, to make a round trip within an elementary work zone the robot must work upon or upon which the robot is currently working.

9. An agricultural machine combination for the implementation of the automated work method for plots of land according to claim 1, said combination comprising:

a fleet of at least two mobile robots, equipped with suitable work tools, operating autonomously and independently, a central common management and control system configured to assess and plan the work to be carried out on a plot of land in question, and communicate with said robots in order to transmit at least one of instructions and controls to the robots, and to receive in return at least one of operating and status information from said robots, each robot also being provided with a satellite positioning or tracking device and with measuring means for its input reserves and its autonomy based on its current and estimated future consumption, and an input supply station, which is mobile, and which is initially positioned on the plot of land in the preferred headland portion predefined by the central common management and control system and in which the input supply station remains located.

\*  \*  \*  \*  \*